United States Patent [19]
Chan et al.

[11] Patent Number: 5,856,422
[45] Date of Patent: Jan. 5, 1999

[54] OPTICALLY ACTIVE POLY(ARYL)ETHERS CONTAINING OPTICALLY PURE SPIROBINDANE AND INDANE MOIETIES

[75] Inventors: Kwok Pong Chan, Troy; Kevin R. Stewart, Schenectady; Janet L. Gordon, Clifton Park, all of N.Y.

[73] Assignee: Molecular OptoElectronics Corporation, Watervliet, N.Y.

[21] Appl. No.: 957,549

[22] Filed: Oct. 24, 1997

[51] Int. Cl.⁶ .............................. C08G 8/02; C08G 64/00; C08G 65/00

[52] U.S. Cl. ......................... 528/125; 528/174; 528/185; 528/190; 528/201; 528/220; 526/257; 526/259; 526/260; 526/261; 526/284; 526/333; 526/334

[58] Field of Search .................................. 528/220, 125, 528/174, 201, 185, 190; 526/284, 333, 334, 257, 259, 260, 261

[56] References Cited

U.S. PATENT DOCUMENTS

| | | | |
|---|---|---|---|
| Re. 34,431 | 11/1993 | Brunelle et al. | 528/352 |
| 2,754,285 | 7/1956 | Petropoulos | 260/47 |
| 2,979,501 | 4/1961 | Petropoulos et al. | 260/619 |
| 3,271,463 | 9/1966 | Howard | 568/719 |
| 4,334,106 | 6/1982 | Dai | 568/719 |
| 4,552,949 | 11/1985 | Mark | 528/201 |
| 4,605,789 | 8/1986 | Silvis et al. | 568/721 |
| 4,879,421 | 11/1989 | Kazlauskas | 568/732 |
| 4,988,785 | 1/1991 | Paul et al. | 526/259 |
| 5,145,926 | 9/1992 | Patel et al. | 528/425 |

OTHER PUBLICATIONS

John C. Wilson, "Polyamides and Polyesters Derived from 1,1,3–Trimethyl–3–(p–aminophenyl)–5–inadanamine and 1,1,3–Trimethly–3–(p–hydroxphenyl)–5–indanol", Journal of Polymer Science: Polymer Chemistry Edit 13, 749–754 (1975) The month in the date of publication is not available.
John C. Petropoulos and James J. Fisher, "The Dimers of Ring Substituted Alpha–Methylstyrenes", J. Amer, Chem. Soc. 80, 1938–41 (1958) The month in the date of publication is not available.
K.C. Stueben, "Polymers Containing the 3,3,3',3'–Tetramethyl–1,1'–Spirobiindane Residue", Journal of Polymer Science: Part A,3,3209–3217 (1965) The month in the date of publication is not available.
R.F. Curtis, "Von Braun's 'Diphenylcyclobutane Derivative': 6,6'–Dihydroxy–3,3,3'3'–tetramethyl–1,1'–spirobi–indane and a Rlated Compound," J. Chem. Soc. 415–418 (1962) The month in the date of publication is not available.
W. Baker and D.M. Besly, "Condensation Products of Phenols and Ketones. Part IV. o–Cresol with Acetone", J. Chem. Soc. 1421–1424 (1939) The month in the date of publication is not available.
F. Ciardelli, "Optically Active Polymers", Encyclopedia of Science and Engineering 10, 463–493 (1987) The month in the date of publication is not available.
P. Pelet and N. Engheta, "The Theory of Chirowaveguides", IEEE Transactions On Antennas and Propagation 38, 90–98, (1990) The month in the date of publication in not available.

*Primary Examiner*—P. Hampton-Hightower
*Attorney, Agent, or Firm*—Heslin & Rothenberg, P.C.; Martha L. Boden, Esq.

[57] ABSTRACT

Optically active poly(aryl)ether polymers prepared from monomers containing optically pure spirobiindane and/or indane moieties are disclosed. The chiral poly(aryl)ether polymers are of high molecular weight and exhibit high optical rotations. In addition, the polyethers are thermally stable at high temperatures and exhibit excellent hydrolytic resistance making them useful in high temperature processing applications, in the fabrication of optoelectronics devices, and as polarizing coatings and filters.

22 Claims, No Drawings

OPTICALLY ACTIVE POLY(ARYL)ETHERS CONTAINING OPTICALLY PURE SPIROBINDANE AND INDANE MOIETIES

The following invention was made with Government support under contract number F33615-95-C-5432 awarded by the United States Air Force. The Government has certain rights in this invention.

FIELD OF THE INVENTION

The present invention relates to chiral polyethers, and more particularly to optically active poly(aryl)ether polymers derived from optically pure spirobiindane and indane moieties.

BACKGROUND OF THE INVENTION

Chiral materials exhibiting no center of symmetry are isotropic birefringent materials having a "handed" molecular structure. This handedness makes them optically active and capable of rotating a plane of polarized light transmitted through them. Polarizing coatings and filters comprise birefringent materials capable of transforming light into polarized light. Thus, chiral materials may be used as polarizers in the fabrication of polarizing coatings and filters.

Recently, Pelet and Engheta in *IEEE Transactions on Antennas and Propagation* 38, 90–98 (1990) have suggested the use of optically active materials in guided-wave structures to produce chiral waveguides. A chiral waveguide, also known as a chirowaveguide, comprises a cylindrical waveguide or parallel conducting plates filled with a homogeneous isotropic chiral material. Applications for chiral waveguides include integrated optical devices, telecommunications electronics systems, printed-circuit elements, and optoelectronics devices.

Organic polymers are known to be compatible with semiconductor electronics technology, can withstand high temperatures during processing, and have a large capacity for engineered properties. In addition, poly(aryl)ethers are a unique class of organic polymeric materials. They are characterized by their excellent mechanical strength per unit weight, high thermal stability, and hydrolytic resistance. Thus, they are often referred to as high performance polymers as compared with polyethylene, polystyrene, polymethylmethacrylate, polybutadiene, etc. Commercially available poly(aryl)ethers include polyphenylene oxide (PPO®), polyether ether ketone (PEEK®), polyether sulfone (UDEL®), and polyether imide (ULTEM®).

Brunelle et al. disclose in U.S. Re. 34,431 cyclic poly (aryl)ether polymers prepared from racemic spirobiindane compounds. These cyclic polyethers include high molecular weight cyclic polyetherimides, polyetherketones, and polyethersulfones, which can then be converted to linear polymers. The cyclic spirobiindane polyetherimides exhibit high glass transition temperatures, typically greater than 200° C. U.S. Pat. No. 5,145,926 to Patel et al. discloses high molecular weight polyetherketones and polyethersulfones containing derivatives of racemic indane compounds. The racemic indane polyethersulfones were found to exhibit a high glass transition temperature of 215° C.

In general, most applications of synthetic polymers require good thermal stability to withstand high temperature processing, but do not require optical activity. However, for use in the formation of polarizing coatings or filters and for utility as chiral waveguides, birefringent materials having polarizing properties must be employed. Due to the low birefringence of the achiral prior art poly(aryl)ether polymers mentioned above, they are not useful in such applications.

Chiral polyether polymers are typically synthesized by polymerizing optically active monomers having an unsaturated alkene adjacent to the ether oxygen in the presence of a catalyst. The unsaturation is usually due to a carbon-carbon double bond in vinyl, acrylic, or methacrylic derivatives. For example, F. Ciardelli discloses in *Encyclopedia of Polymer Science and Engineering* Optically Active Polymers 10, 463–493 (1987) the preparation of optically active vinyl ethers, alkenyl vinyl ethers, and alkyl vinyl ketones from unsaturated chiral monomers. In addition, Ciradelli discloses the use of chiral cyclic monomers in forming linear optically active polymers through ring-opening polymerization reactions. These chiral polymers have shown utility as chiral reagents and catalysts for asymmetric synthesis, as packing materials for chromatographic columns for enantiomeric resolution, and as chiral materials for the preparation of liquid crystal polymers.

However, the aforementioned optically active polyethers exhibit low glass transition temperatures (<150° C.) and have low thermal stability. Thus, these chiral polymers are not useful in applications that require high temperature processing, such as in the fabrication of optoelectronics devices.

Therefore, a need exists for optically active organic polymers that retain the aforementioned thermal advantages associated with high performance poly(aryl)ether polymers. In addition, a need exists for optically active polymers that can be used as polarizers and that can be used in high temperature processing applications, such as in the fabrication of opteoelectronics devices. Such polymers should have excellent processability and should be tough, durable, thermally stable, and water resistant.

The novel chiral polyether polymers of the present invention meet the above needs. Surprisingly, the present polyethers are not only optically active, but also exhibit excellent hydrolytic resistance and thermal properties, such as high glass transition temperatures or melting points. Thus, unlike known optically active polymers, the present polymers are particularly useful in high temperature processing applications.

SUMMARY OF THE INVENTION

The present invention is based on the discovery that compounds containing optically pure spirobiindane and/or indane moieties can be polymerized to form a wide variety of unique optically active poly(aryl)ether polymers. The novel chiral polymers of the present invention exhibit similar properties to those associated with their achiral analogs and to those associated with the high performance polyethers of the prior art. For example, the present optically active polyether polymers typically exhibit high glass transition temperatures of at least 151° C. or melting points of at least 250° C. However, unlike known polyether polymers, the present optically active polyethers have additional applications in the field of optoelectronics in the fabrication of chiral waveguides and can be used as polarizing coatings and filters. The present polymers are characterized by their high optical rotations and, as stated above, by their excellent thermal properties at high temperatures (>150° C). In addition, the polymers are of high molecular weight, typically between about 10 kg/mole and 500 kg/mole.

More particularly, the novel optically active poly(aryl) ether polymers, which will also be referred to below as "polyether polymers" of the present invention are polymerized from monomers containing optically pure spirobiindane and/or indane moieties of formulas (IVA), (IVB), (VA), and (VB) below. The enantiomeric monomers are typically derived from chiral spirobiindanols and chiral indanols.

The optically active poly(aryl)ether polymers of the present invention comprise structural units of formulas (I), (II), and (III)

and

wherein m is the mole fraction of structure (II), n is the mole fraction of structure (III), and the quantity 1−(m+n) is the mole fraction of structure (I); wherein m and n each independently have a value from 0 to about 0.99, and the sum of m and n is from 0 to about 0.99.

Each $R^1$ and $R^2$ in the structural formulas below is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof. Preferably, each $R^1$ is hydrogen or deuterium, and each $R^2$ is methyl, trifluoromethyl, or a deuterated equivalent thereof.

$A^1$ may be an optically active spirobiindane moiety having structural formula (IVA) or (IVB).

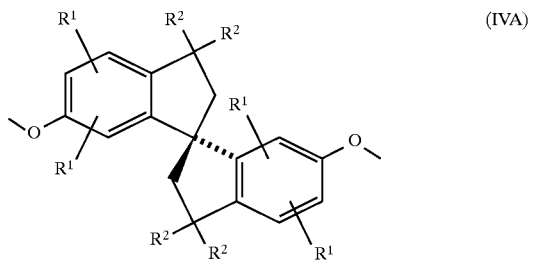

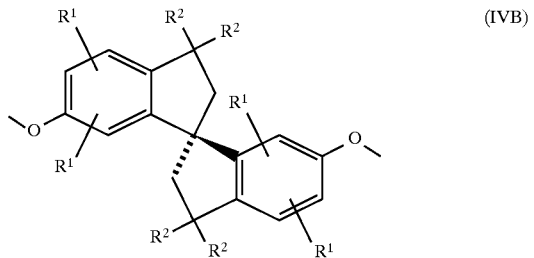

The enantiomeric moieties of formulas (IVA) and (IVB), referred to herein as "spirobiindane moieties", are typically derived from the enantiomers of 6,6'-dihydroxy-3,3,3',3'-tetra($R^2$) spirobiindanes, which are also referred to herein as "spirobiindanols" or "spirobiindane bisphenols". The spirobiindanes may be substituted or unsubstituted.

Alternatively, $A^1$ is a chiral indane moiety of formula (VA) or (VB).

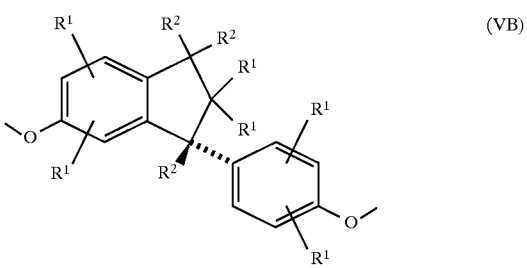

The enantiomeric moieties of formulas (VA) and (VB), referred to herein as "indane moieties", are generally derived from the enantiomers of 5-hydroxy-3-(4-hydroxyphenyl)-1,1,3-tri($R^2$)indane, which are also referred to herein as "indanols" or "indane bisphenols", and which may be substituted or unsubstituted.

The optically active polyether polymers of the present invention include chiral homopolymers containing only structural units (I), wherein m and n are each 0. In addition, the invention includes random copolymers comprising structural units (I) and (II), and optionally (III), which are randomly dispersed in the polymeric chain. In the copolymers containing structural units (I) and (II), n is 0, and m has a value other than 0, such as 0.50. In the copolymers additionally containing structural units (III), n also has a value other than 0. For example, the values of m, n, and 1−(m+n) may each be 0.33.

$A^2$ and $A^3$ are each independently a structural moiety selected from the group having formulas (IVA), (IVB), (VA), (VB), (VI), (VII), (VIII), (VIIIa), or (VIIIb).

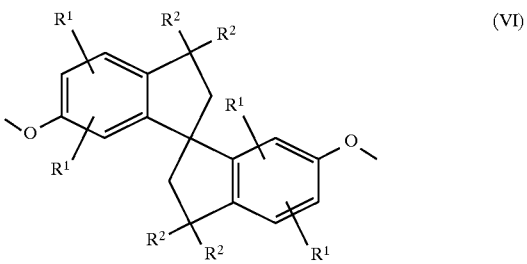

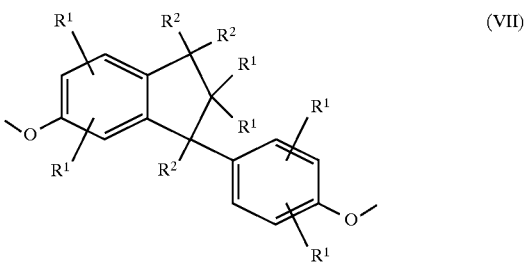

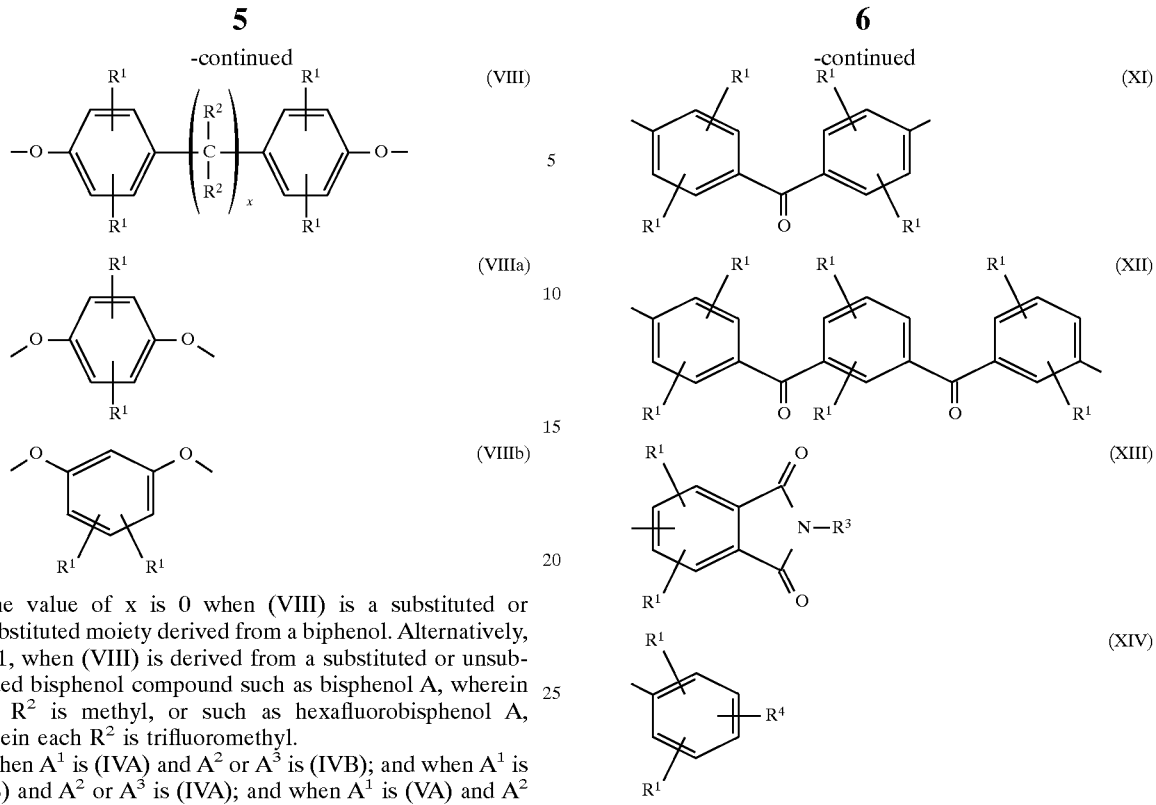

The value of x is 0 when (VIII) is a substituted or unsubstituted moiety derived from a biphenol. Alternatively, x is 1, when (VIII) is derived from a substituted or unsubstituted bisphenol compound such as bisphenol A, wherein each $R^2$ is methyl, or such as hexafluorobisphenol A, wherein each $R^2$ is trifluoromethyl.

When $A^1$ is (IVA) and $A^2$ or $A^3$ is (IVB); and when $A^1$ is (IVB) and $A^2$ or $A^3$ is (IVA); and when $A^1$ is (VA) and $A^2$ or $A^3$ is (VB); and when Al is (VB) and $A^2$ or $A^3$ is (VA); then the mole fraction m or n of structural units (II) or (III) corresponding to $A^2$ or $A^3$ differs from the mole fraction (1-(m+n)) of structural units (I) corresponding to $A^1$.

The optically active poly(aryl)ether polymers include: optically active polyethersulfones, wherein $Z^2$ has structural formula (IX) and a is 0; optically active polyetherketones, wherein $Z^2$ has structural formula (X), (XI), or (XII) and a is 0; and optically active polyetherimides, wherein a is 1, and $Z^2$ has structural formula (XIII) or (XIV), and $Z^1$ has corresponding structural formula (XIII') or (XIV'). The invention also includes optically active polyetherimides, wherein a is 1, and $Z^2$ has formula (XIII) in structure (I), $Z^2$ has formula (XIV) in structure (II); and wherein each $Z^1$ has the respective structural formula (XIII') or (XIV'). Thus, in structural units (I), (II), and (III), a is 0 except when selected structural moiety $Z^2$ has formula (XIII) or (XIV), then a is 1, and $Z^1$ has structural formula (XIII') when $Z^2$ has formula (XIII), and $Z^1$ has structural formula (XIV') when $Z^2$ has formula (XIV).

Formulas (IX)–(XIV) are represented by the following structural moieties.

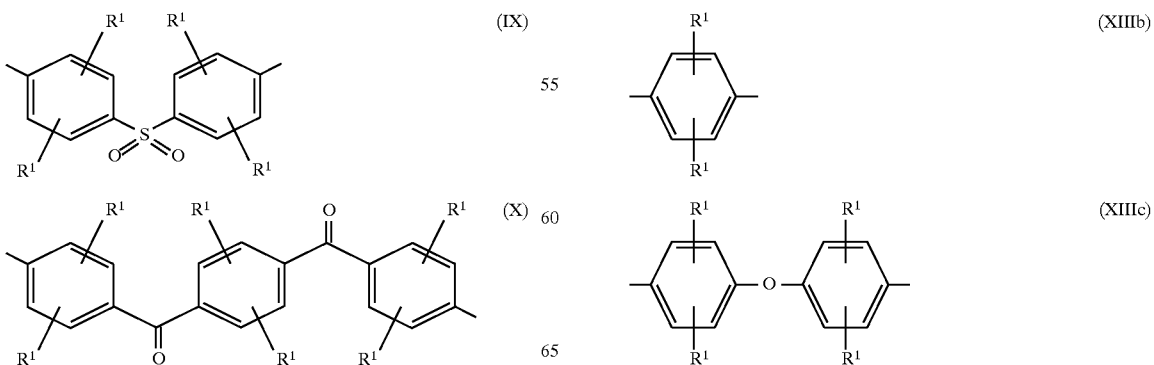

In addition, when $Z^2$ is a structural moiety having formula (XIII) or (XIV), then $A^2$ and $A^3$ may also each independently be a single bond, —O—, —S—, —$SO_2$—, —CO—, —$C(CH_3)_2$—, —$C(CD_3)_2$—, —$C(CF_3)_2$—, or a structural moiety having formula (VIIc).

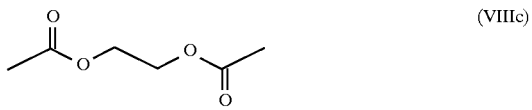

$R^3$ in structure (XIII) is selected from the group of structural moieties having formulas (XIIIa), (XIIIb), (XIIIc), (XIIId), or (XIIIe)

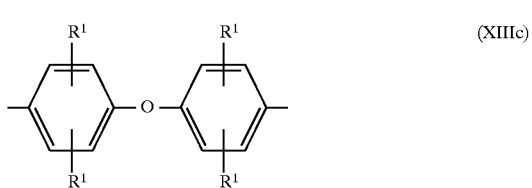

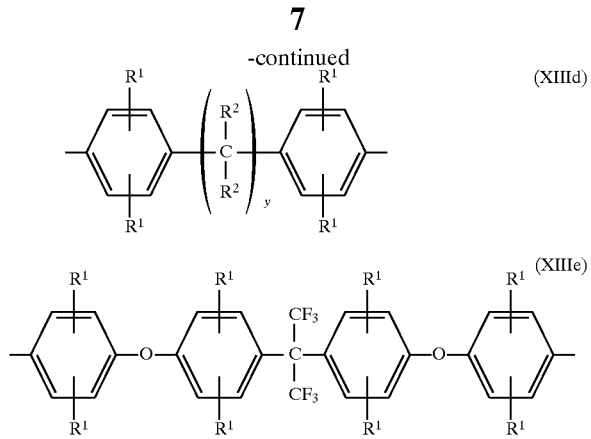

The value of y is 0, for example, when (XIIId) is derived from a 4,4'-(diamino)biphenyl compound. Alternatively, y is 1, for example, when (XIIId) is a derivative of a bisphenol diamine.

$R^4$ in structure (XIV) is selected from the group of structural moieties having formulas (XIVa), (XIVb), or (XIVc).

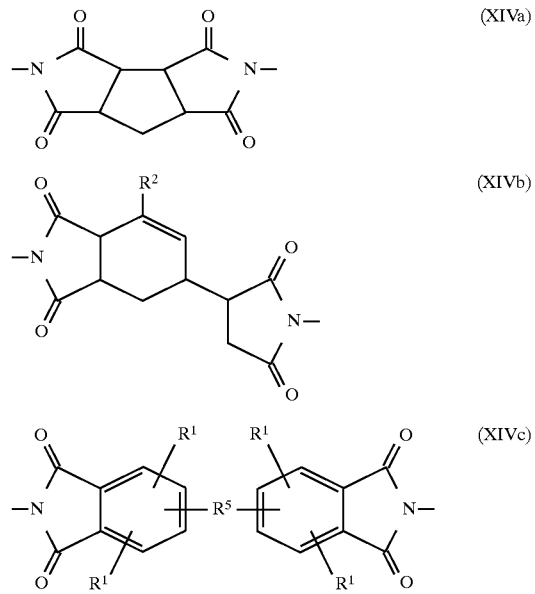

$R^5$ in structure (XIVc) is a single bond or is selected from the group of —O—, —S—, —SO$_2$—, —CO—, —C(CH$_3$)$_2$—, —C(CD$_3$)$_2$—, —C(CF$_3$)$_2$—, or from the group of structural moieties having formulas (IVA), (IVB), (VA), (VB), (VI), (VII), (VIII), (VIIIa), (VIIIb), or (VIIIc), except when m and n are both 0, then $R^5$ is other than formula (IVA) when $A^1$ is formula (IVB); other than formula (IVB) when $A^1$ is formula (IVA); other than formula (VA) when $A^1$ is formula (VB); and other than formula (VB) when $A^1$ is formula (VA).

Structural formulas (XIII') and (XIV'), from which $Z^1$ is selected, are represented by the following structures.

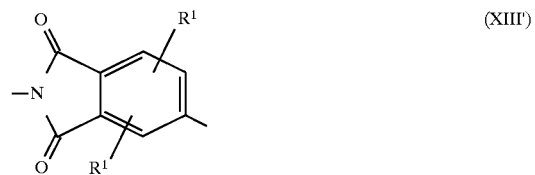

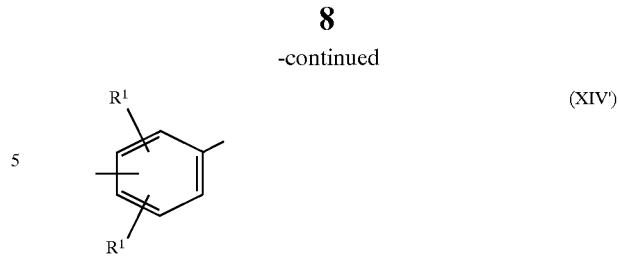

DESCRIPTION OF THE PREFERRED EMBODIMENTS

The present invention relates to novel optically active poly(aryl)ether polymers containing optically pure spirobiindane and/or indane moieties of formulas (IVA), (IVB), (VA), and (VB) above. More particularly, the chiral polymers include linear homopolymers having structural units (I), wherein each $A^1$ is a chiral spirobiindane or chiral indane derivative, and random linear copolymers in which structural units (I) and (II), and optionally (III), are randomly dispersed throughout the polymeric chain.

Each $R^1$ and $R^2$ substituent of chiral structural moieties (IVA), (IVB), (VA), and (VB), of racemic moieties (VI) and (VII), and of the achiral moieties (VIII), (VIIIa), (VIIIb), (VIIIc), (IX)–(XIV), (XIIIa)–(XIIIe), (XIVa)–(XIVc), (XIII'), and (XIV'), is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof. Illustrative useful $R^1$ and $R^2$ substituents are hydrogen, alkyl such as methyl, ethyl, butyl, pentyl, octyl, nonyl, tert-butyl, neopentyl, isopropyl, sec-butyl, dodecyl, and the like; aryl such as phenyl; cycloalkyl such as cyclohexyl, cyclooctyl, cycloheptyl, cyclopentyl, and the like; alkoxyalkyl and aryloxyalkyl such as phenoxymethylene, phenoxyethylene, methoxymethylene, ethoxymethylene, methoxyethylene, butoxymethylene, propoxyethylene, and the like; arylalkyl such as phenylethyl, phenylpropyl, benzyl, and the like; and substituted alkyl and aryl groups such as cyanomethyl, 3-chloropropyl, 3,4-dichlorophenyl, 4-chloro-3-cyanophenyl, chloromethyl, dichloromethyl, trichloromethyl, fluoromethyl, difluoromethyl, trifluoromethyl, 4-nitrophenyl, phenoxyphenyl, 4-methylphenyl, 2,4-dimethylphenyl, 2-nitroethyl, nitromethyl, and the like. In addition, deuterated substituents $R^1$ and $R^2$ in which at least one hydrogen is replaced with the deuterium isotope may be employed. Each $R^1$ is preferably hydrogen or deuterium, and each $R^2$ is preferably an alkyl radical such as methyl, a halogenated alkyl radical such as trifluoromethyl, or a deuterated equivalent thereof.

Most often, the chiral spirobiindane moieties (IVA) and (IVB) are derived from the enantiomers of 6,6'-dihydroxy-3,3,3',3'-tetramethyl spirobiindane, wherein $R^2$ is methyl, and $R^1$ is hydrogen. 6,6'-Dihydroxy-3,3,3',3'-tetramethyl spirobiindane, which is also referred to herein as "SBI", is usually used as the starting material due to its ease in preparation and the commercial availability and low cost of 2,2-bis(4-hydroxyphenyl) propane, which is commonly known as and referred to herein as "bisphenol-A" or "BPA". SBI is represented by the following structure:

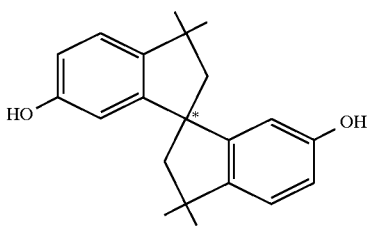

SBI wherein the asterisk (*) represents the chiral carbon. However, it should be noted that the present invention is not limited to the use of SBI, and other substituted spirobiindane bisphenols, wherein $R^1$ and $R^2$ are defined above, are equally effective in producing optically active polyether polymers having the advantageous properties described earlier.

The optical rotational orientations and absolute configurations associated with structural moieties (WA) and (IVB) derived from the enantiomers of SBI are, respectively, (S)(−) and (R)(+). Thus, as used herein, "(S)G()-SBI" refers to (S)(−)-6,6- dihydroxy-3',3,3',3'-tetramethyl spirobundane or moieties thereof, and "(R)(+)-SBI" refers to (R)(+)-6,6'-dihydroxy-3,3,3',3'-tetramethyl spirobuindane or its associated derivatives. Typically, the optically active polyether polymers of the present invention that are derived from either enantiomer of SBI will have a glass transition temperature of at least 151° C. or a melting point of at least 250° C.

The indane moieties of formulas (VA) and (VB), are usually derived from the enantiomers of 5-hydroxy-3-(4-hydroxyphenyl)-1,1,3-trimethyl indane, which is also referred to herein as "IBP", wherein each $R^1$ is hydrogen, and each $R^2$ is methyl. However, other substituted indane bisphenols, wherein $R^1$ and ci are defined above, may be used to prepare the optically active polyether polymers of the present invention, and the invention is not limited to polymers derived from IBP. IBP is represented by the following structure:

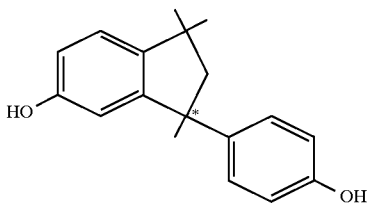

IBP wherein the asterisk (*) represents the chiral carbon.

The absolute configurations corresponding to the structural moieties derived from the enantiomers of IBP are (S)(−) for (VA), and (R)(+) for (VB). Thus, as used herein, "(S) (−) -IBP" refers to (S) (−) -5-hydroxy-3-(4-hydroxyphenyl)-1,1,3-trimethyl indane and moieties thereof, and "(R) (+) -IBP" refers to (R) (+)-5-hydroxy-3-(4-hydroxyphenyl)-1,1,3 -trimethyl indane and its derivatives. Glass transition temperatures and melting points exhibited by optically active polyether polymers derived from either enantiomer of IBP are generally at least 151° C. and at least 250° C., respectively.

Methods for preparing racemic spiroblndane bisphenols for use in the practice of this invention are disclosed in various references. For example, substituted spirobiindane bisphenols can be conveniently prepared by reacting the appropriately substituted BPA with concentrated hydrochloric acid, as described by Curtis in *J. Chem. Soc.*, 415–418 (1962), the disclosure of which is incorporated herein by reference. In addition, Baker and Besly, *J. Chem. Soc.* 1421 (1939), U.S. Pat. No. 2,979,534, and Stueben, *J. Poly. Sci.*, Part A, 3, 3209-17 (1965), which are incorporated herein by reference, disclose the conversion of bisphenols, such as BPA, to the corresponding spirobiindanols using sulfuric acid, benzenesulfonic acid, or p-toluenesulfonic acid. The preparation of spirobiindanols using the aforementioned condensation reaction of BPA in the presence of sulfuric acid is also described in U.S. Pat. No. 3,271,463, which is also incorporated herein by reference. U.S. Pat. No. 4,552,949, which is incorporated herein by reference, discloses the reaction in the presence of anhydrous methanesulfonic acid or hydrochloric acid, and U.S. Pat. No. 4,605,789, which is also incorporated herein by reference, teaches the reaction in the presence of strong acid cation exchange resins.

Racemic indane bisphenol compounds for use in the practice of this invention can be prepared according to the method disclosed in U.S. Pat. No. 4,334,106 by treating iso-propenyl phenol (IPP) or a mixture of its linear oligomers with a stoichiometric excess of organic acid. IPP can be prepared by base catalyzed cracking of BPA. The disclosure of U.S. Pat. No. 4,334,106 is incorporated herein by reference. Alternatively, indane bisphenols can be prepared by reacting the corresponding indanamine with sodium nitrite in the presence of aqueous acid as described by J. C. Wilson, *J. Poly. Sci.: Polymer Chemistry Edition* 13, 749 (1975), which is incorporated herein by reference. Also, see U.S. Pat. No. 2,979,534, which is also incorporated herein by reference. The indanamine can be prepared by the method described by J. C. Petropoulos and J. J. Fisher, *J. Amer. Chem. Soc.* 80, 1938 (1958) from the corresponding carboxy indane compound, which is also incorporated herein by reference.

Racemic spirobiindanol mixtures may be resolved into their individual enantiomers for use in the present invention using an esterase-catalyzed asymmetric hydrolysis, which is disclosed by Kazlauskas in U.S. Pat. No. 4,879,421 for racemic esters of SBI, the disclosure of which is incorporated herein by reference. Racemic indane bisphenol mixtures may be resolved using a lipase-catalyzed stereo- and regio-selective hydrolytic process as disclosed for the preparation of IBP in the commonly assigned U.S. patent application being filed concurrently herewith and corresponding to Attorney Docket No. 0953.031, the disclosure of which is also incorporated herein by reference. Alternatively, the enantiomers may be separated using traditional separation techniques, such as fractional crystallization or HPLC using columns packed with chiral stationary phase.

The relative amounts of structural units (I), (II), and (III) in the polymeric polyether compositions can be represented as mole fractions, where the mole fraction of (II) is given by m, the mole fraction of (III) is given by n, and the mole fraction of structural unit (I) is 1−(m+n). The values of m and n are each independently from 0 to about 0.99, and the sum of m and n is from 0 to about 0.99. Thus, optically active linear polyether homopolymers containing only structural units (I), wherein m and n are 0, are included in the present invention, as well as optically active linear copolyethers containing the additional structure (II), wherein m is greater than 0, and optionally (III), wherein n is also greater than 0. In the copolyether compositions, the structural units (I) and (II), and (III) when (III) is included, are randomly dispersed along the polymeric chain backbone to form a "random copolymer".

The moiety $A^1$ of structure (I) has one of formula (IVA), (IVB), (VA), or (VB). Structural units (II) and /or (III) may also include a derivative of the enantiomers of spirobiindanes or indanes, wherein $A^2$ or $A^3$ is also (IVA), (IVB), (VA), or (VB). However, because the polymers of the present invention are optically active, when $A^1$ is (IVA) and either $A^2$ or $A^3$ is (IVB), then the mole fraction of structural units (I), (1−(m+n)), must differ from the mole fraction of the structural unit (II) or (III) containing structure (IVB), i.e. either m or n. Otherwise, the optical rotation of structural units (II) or (III) would be exactly equal in magnitude but opposite in direction to that of structural units (I), and the overall rotation would have a value of 0. In effect, although the polymer would comprise optically active monomeric units, the overall optical activity would be canceled after polymerization.

For the same reason, when $A^1$ in structural units (I) is (IVB) and $A^2$ or $A^3$ is (IVA); and when $A^1$ is (VA) and $A^2$ or $A^3$ is (VB); and when $A^1$ is (VB) and $A^2$ or $A^3$ is (VA); then the mole fraction m or n of structural units (II) or (III) corresponding to $A^2$ or $A^3$ must differ from the mole fraction (1−(m+n)) of structural units (I) corresponding to $A^1$. Otherwise, the polymeric polyether formed would not be optically active.

Alternatively, structure (II) or (III) may include as $A^2$ or $A^3$, respectively, a racemic spirobiindane moiety having formula (VI) or a racemic indane moiety having formula (VII) in the copolymer. In another embodiment, $A^2$ or $A^3$ is a moiety having formula (VIII), wherein x is 0 or 1. When x is 0, formula (VIII) is a derivative of a substituted or unsubstituted biphenol, and when x is 1, (VIII) is a derivative of a bisphenol wherein a bridging carbon connects the phenol moieties. Due to their commercial availability, structure (VIII) is preferably a derivative of one of the following: 4,4'-biphenol, wherein x is 0, and each $R^1$ is hydrogen; BPA, wherein x is 1, each $R^1$ is hydrogen, and each $R^2$ is a methyl group; or 4,4'-(hexafluoroisopropylidene)diphenol, commonly known as hexafluorobisphenol A, wherein x is 1, each $R^1$ is hydrogen, and each $R^2$ is trifluoromethyl. In still other embodiments, $A^2$ or $A^3$ is a moiety having formula (VIIIa), which is derived from resorcinol, or a moiety having formula (VIIIb), which is derived from hydroquinone. Usually, $A^1$ differs from each of $A^2$ and $A^3$, and $A^2$ differs from $A^3$ in the present polymers.

In the polyetherimides of the present invention, where a is 1, $A^2$ or $A^3$ in structural units (II) or (III) may instead be a moiety having formula (VIIIc), which is derived from ethylene glycol bis(anhydrotrimellitate). Alternatively, in the optically active polyetherimides, $A^2$ or $A^3$ in structural units (II) or (III) may be a single bond, or a bridging radical which separates $Z^2$ from $Z^1$. Examples of bridging radicals include —O—, —S—, —$SO_2$—, —CO—, —$C(CH_3)_2$—, —$C(CD_3)_2$—, or —$C(CF_3)_2$—.

The molar proportions of the optically active structural units (I) to structural units (II) and optionally (III) will depend on whether the chiral poly(aryl)ether polymer being prepared is a homopolyether or a copolyether. When the polyether is a random copolymer, the mole fractions of the structural units may vary widely depending on the application and which properties are desired. For example, in the polyethersulfones, the observed glass transition temperature values are lowest in the chiral homopolyethers, wherein the mole fractions of (II) and (III), m and n, respectively, are 0, and increase as the mole fraction of structural unit (I) decreases. By contrast, the observed optical rotations are the greatest (highest absolute value) for the homopolyethers containing only structural units (I). The magnitudes of the optical rotations decrease as the relative amount of structure (I) in the copolyethersulfone decreases, and the proportion of structures (II) and (III) increases. For example, the relative molar proportions of a typical copolymer containing structures (I) and (II) could be 50:50, wherein m is 0.50, n is 0, and 1−(m+n) is 0.50, and a copolymer containing (I), (II), and (III) could be 33:33:33, wherein m and n are each 0.33, and 1−(m+n) is 0.33.

The weight average molecular weight (Mw, kg/mole) of the optically active polyether polymers of the present invention may vary widely. In general, the weight average molecular weight ranges from about 10 kg/mole to about 500 kg/mole. A high molecular weight ($\geq 10$ kg/mole) is desirable to ensure that the integrity of the material is maintained when exposed to high temperatures (>150° C.). The high molecular weight chiral polyether polymers of the present invention exhibit excellent thermal properties, such as high glass transition temperatures (Tg) generally of 151° C. or more, but more typically greater than 210° C. Alternatively, the polymers have high melting points, generally of at least 250° C., but more typically, greater than 350° C. Thus, the present optically active polyethers remain thermally stable at high temperatures making them particularly useful in high temperature processing and optoelectronics applications.

Dispersivity, defined herein as Mw/Mn, provides a measurement of the distribution of chain lengths in a polymeric sample. A dispersivity of 1 indicates a uniform chain length throughout the sample. Mn is the number average molecular weight of a polymer and is a function of the total number of molecules in a sample and the molecular weight of each molecule. The dispersivity for the chiral SBI polyethersulfones and polyetherketones of the present invention ranges between about 1.9 and 2.2.

To restate, the optically active poly(aryl)ether polymers of the present invention include a wide variety of novel homopolyethers and random copolyethers containing chiral sprirobiindane moieties and/or chiral indane moieites. The invention includes: optically active polyethersulfones, wherein $Z^2$ has structural formula (IX); optically active polyetherketones, wherein $Z^2$ has structural formula (X), (XI), or (XII); and optically active polyether imides, wherein a is 1, and $Z^2$ has structural formula (XIII) and/or (XIV), and $Z^1$ has corresponding structural formula (XIII') and/or (XIV'). $R^1$ and $R^2$ in the structures are as defined above. Consideration will now be given to each of these types of optically active polyether polymers with preferred parameters and illustrative methods of preparation.

Unless otherwise indicated, the remaining reactants and reagents used in the reactions described below are readily available materials. Such materials can be conveniently prepared in accordance with conventional preparatory procedures or obtained from commercial sources. Deuterated compounds for use in the preparation of deuterated optically active polyethers may be prepared using deuterated reactants in the reactions below.

Weight average molecular weight, Mw, and number average molecular weight, Mn, of the polyether polymers of the present invention were measured by gel permeation chromatography (GPC) and calibrated against a polystyrene standard. Thermal analyses were performed in a nitrogen atmosphere (40 mL/min.) at a heating rate of 20° C./min. using a Perkin Elmer Differential Scanning Calorimeter (DSC) 7 equipped with Pyris software. The thermal measurements were used to calculate glass transition temperatures (Tg(° C.)). Optical rotations were determined with a Steeg & Reuter polarimeter equipped with a sodium lamp.

Use of SBI and IBP in the examples that follow are for illustrative purposes, and one of ordinary skill in the art would understand that other substituted and unsubstituted spirobiindanols and indane bisphenols may be used instead to provide the polyether polymers of the present invention. The present invention is not limited to the specific embodiments found in the examples.

Polyetherimides

In the optically active polyetherimides comprising structural formula (I), and optionally (II) and (III), $Z^2$ has either structural formula (XIII) or (XIV). The structure of $Z^2$ may be, but need not be, the same in all (I), (II), and (III). For example, $Z^2$ may have formula (XIII) in structural unit (I) and have formula (XIV) in structural unit (II). In addition, in the polyetherimides, a is 1, $Z^1$ has structural formula (XIII') when $Z^2$ has structural formula (XIII), and Z' has formula (XIV') when $Z^2$ is (XIV).

The optically active polyetherimides of the present invention may be prepared by the reactions described below and in the following examples in which intermediates having the general formula (XV) are formed:

$$Y-X-Y \qquad (XV)$$

"X" is a structural moiety of a chiral spirobiindanol corresponding to formula (IVA) or (IVB); a structural moiety of a chiral indane bisphenol corresponding to formula (VA) or (VB); or a derivative of a bisphenol or biphenol of formula (VI)–(VIII); a moiety of formula (VIIIa), (VIIIb), or (VIIIc); or a single bond, —O—, —S—, —SO$_2$—, —CO—, —C(CH$_3$)$_2$—, —C(CD$_3$)$_2$—, or —C(CF$_3$)$_2$—.

As used herein, a "bisimide" or "bis-N-alkylimide" refers to a compound wherein each "Y" in formula (XV) above is represented by formula (XVa):

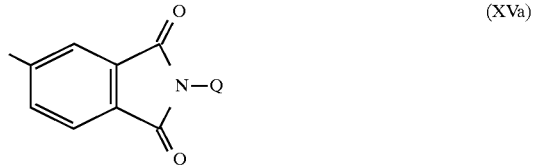

wherein Q is an alkyl group containing 1 to 10 carbons;

a "tetracarboxylic acid" or "tetraacid" of "X" is formed when each "Y" is structure (XVb):

an "X"-"dianhydride" or "diphthalic anhydride" refers to a compound wherein each "Y" is represented by structure (XVc):

"nitrophenoxy" refers to the "Y" functional group having the structure (XVd):

and a "diphenoxyamine" or "diamine" of "X" is formed when formula (XV) contains two aminophenoxy groups, and each "Y" is structure (XVe):

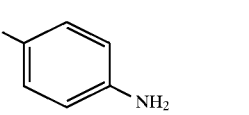

In general, the dianhydrides of structure (XVc), which are described herein, (and by extension, other derivatives of tetracarboxylic acids (XVb) by way of their conversion to dianhydrides) may be converted to the polyetherimides of this invention by reaction with diamines. Such conversions are well-known in the art, and the following Procedures 1, 2, and 3, and accompanying examples are descriptive of the conversions as they relate to the preparation of the present optically active polyetherimide polymers.

Process temperatures in the polymerization reactions of Procedures 1, 2, and 3 are not critical and can vary widely. The polymerization reactions may be conducted at room temperature, between about 20°–25° C., or alternatively, at elevated temperatures up to about 225° C.

The processes are carried out in an inert atmosphere over a period of time sufficient to produce the desired polymer in adequate yield. Reaction times are influenced by the reactants, reactant temperature, the concentration of the reactants (and catalyst if present), the choice of solvent, and other factors known to those of skill in the art. In general, reaction times can vary between about 4.5 hours for preparing polyetherimides at elevated temperatures and 68 hours at room temperature.

Procedure 1

The optically active polyetherimide polymers of the present invention wherein $Z^2$ is (XIII) and $Z^1$ is (XIII') in structures (I), (II), and (III), i.e. phthalimide moieties, can be prepared by initially reacting a chiral spirobiindanol, such as (R)(+)-SBI or (S)(–)-SBI or a chiral indane bisphenol, such as (S)(–) - IBP or (R)(+)-IBP, with an N-alkyl-4-nitrophthalimide, wherein the alkyl group may have from 1 to 10 carbons. N-methyl-4-nitrophthalimide, which is commercially available from General Electric, is preferred. A spirobiindane bisimide or indane bisimide of formula (XVa) above containing the electron-deficient N-alkyl substitutent is produced. Hydrolysis of the bisimide to the corresponding tetracarboxylic acid of formula (XVb) followed by dehydration produces the chiral spirobiindane or indane diphthalic anhydride (dianhydride) of structure (XVc). Finally, polymerization is conducted by reacting an appropriate diamine with the dianhydride to produce a chiral polyetherimide polymer.

Diamines useful in the polymerization may be substituted or unsubstituted, and examples include morphenylenediamine from which structures (XIIIa) and (XIIIb) are derived. Other examples include 4,4'-oxydianiline (diamine of XIIIc, $R^1$=H); 4,4'-(diamino)biphenyl, commonly known as benzidine (diamine of XIIId, y=0, R'=H); 2,2'-bis(4-aminophenyl)propane (diamine of XIIId, y=1, $R^1$=H, $R^2$=methyl); 2,2'-bis(4-aminophenyl) hexafluoropropane (diamine of XIIId, y=1, $R^1$=H, $R^2$=CF$_3$); and 2,2'-bis[4(4-aminophenoxy)phenyl] hexafluoropropane (diamine of XIIIe, $R^1$=H).

Approximately equimolar amounts of the dianhydride and diamine are typically reacted in a high boiling polar aprotic solvent, such as N-methyl-2-pyrrolidinone (NMP), dimethylformamide (DMF), or dimethyl sulfoxide (DMSO) producing a chiral polyetherimide homopolymer comprising structural units (I).

To produce a random copolymer in which structural units (I) and (II) are randomly distributed, a dianhydride, as defined above, of formulas (VI)–(VIII), (VIIIa), (VIIIb), or (VIIc), such as BPA dianhydride, 4,4'-biphenol dianhydride, hexafluorobisphenol A dianhydride, resorcinol dianhydride, hydroquinone dianhydride or ethylene glycol bis (anhydrotrimellitate), for example, may be added to the polymerization reaction in varying molar amounts, and the amount of diamine appropriately adjusted. For example, the dianhydride of an (R)(+)-indane moiety (VB) can be added in equimolar amounts with 4,4'-biphenol dianhydride (VIII), wherein x is O and $R^1$ is hydrogen, and reacted with a diamine present in a molar amount equal to the total moles of the two dianhydride compounds. A random copolymer comprising 50% of each structural unit (I) and (II) is produced. Alternatively, two different chiral dianhydrides, each containing a structural moiety (IVA), (IVB), (VA), or (VB) therein, may be combined in the desired molar proportions with a diamine to form a copolyetherimide of structural units (I) and (II). Other dianhydrides that may be added include those in which a single bond, —O—, —S—, —SO₂—, —CO—, —C(CH₃)₂—, —C(CD₃)₂—, or —C(CF₃)₂— bridges each phthalic anhydride unit. These additional dianhydrides are commercially available from Chrisev Co., Inc., USA or from TCI America, USA.

In addition, a third dianhydride, differing from but chosen from those described above with respect to the first two, may be reacted with an equivalent molar amount of diamine added to produce a random copolyetherimide polymer in which structures (I), (II), and (III) are randomly distributed throughout the polymeric chain.

As stated above, the mole fractions of structures (I), (II), and optionally (III) may vary widely depending on the properties desired in the resulting optically active polyetherimide polymer.

Particularly preferred optically active polyetherimides prepared by Procedure 1 comprise structural units (I), wherein $Z^2$ is (XIII), $R^3$ is (XIIIa), $Z^1$ is (XIII'), and each $R^1$ is hydrogen. These polyetherimides have structural units (I) represented by (ii) Synthesis of (R)(+)-IBP Tetraacid A 250 mL round bottomed flask equipped with a condenser is charged with the chiral product of step (i)(15 g, 25.5 mmol), potassium hydroxide (16.3 g, 290 mmol), and water (60 mL). The solution is magnetically stirred and refluxed for 3 days. The solution is then cooled to room temperature and poured into aqueous hydrochloric acid (70 mL conc. HCl in 140 mL of water). The solution is extracted with ethyl acetate (3×30 mL), the ethyl acetate layer isolated and evaporated to dryness to give the desired (R)(+)-IBP tetraacid. The structure is confirmed by proton nuclear magnetic resonance.

(iii) Synthesis of (R)(+)-IBP Dianhydride (R)(+)-IBP tetraacid (12 g) in acetic anhydride (24 mL) is heated to reflux for 1 min. in a 250 mL round bottomed flask, then the solvent is removed under reduced pressure. The resulting crude chiral IBP dianhydride is purified by short path distillation at 330° C. at 0.2 mm Hg pressure to yield pure (R)(+)- indane dianhydride. Proton nuclear magnetic resonance is used to confirm the structure.

(iv) Synthesis of (R)(+)-IBP Polyetherimide

The polymerization is conducted in a 25 mL round bottomed flask in an argon-filled glove box. The flask is charged with (R)(+)-IBP dianhydride (1.500 g, 2.7 mmol), m-phenylenediamine (0.289 g, 2.7 mmol), and N-methyl-2-pyrrolidinone (NMP) (I 0 g). The solution is stirred at room temperature for 12 h, followed by the addition of acetic anhydride (1 mL) and triethylamine (1.5 mL). The resulting solution is stirred at room temperature for another 48 h, and precipitated into methanol. The precipitate is filtered, then dried in a vacuum oven (120° C.) for 12h to give the desired (R)(+)-IBP polyetherimide. The homopolyetherimide comprises structural units (I) represented by -[(XIII')-(VB)-(XIII)]-, wherein $R^3$ is (XIIIa), each RI is hydrogen, and each $R^2$ is methyl. The structure is confirmed by proton nuclear magnetic resonance. (An analogous reaction using racemic IBP for the (R)(+)-IBP resulted in a 90% product

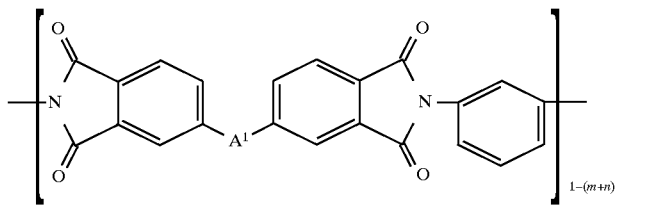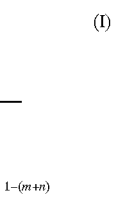

(I)

The following examples are illustrative.

EXAMPLE 1

(i) Synthesis of (R) (+) -IBP Bisimide

A 1 L three-neck round bottomed flask equipped with a nitrogen inlet, thermometer, Dean-Stark trap, and condenser is charged with (R)(+)-5-hydroxy-3-(4-hydroxyphenyl)-1,1, 3-trimethylindane (20 g, 74.5 mmol), dimethyl sulfoxide (DMSO) (130 mL), toluene (140 mL), and aqueous sodium hydroxide (50% w/w, 11.6 g). The solution is magnetically stirred and heated to reflux for 3 h, then cooled to ~60° C., followed by the addition of N-methyl-4-nitrophthalimide (29.8 g, 144.5 mmol) and tetrabutylammonium bromide (1.16 g, 3.6 mmol). The resulting solution is refluxed for 5 additional hours. Toluene is removed at reduced pressure, and the resulting reaction mixture is precipitated into water (200 mL). The crude product is collected by suction filtration, then recrystallized from methanol (200 mL) to give the desired (R)(+)-IBP bisimide. The structure is confirmed by proton nuclear magnetic resonance.

yield (1.2 g) and a polymer having a weight average molecular weight (Mw) of 23 kg/mole.)

EXAMPLE 2

The procedure of Example 1 is repeated except that in step (iv), the flask is charged with (R)(+)-IBP dianhydride (1.500 g, 2.7 mmol), bisphenol A (BPA) dianhydride (1.405 g, 2.7 mmol), m-phenylenediamine (0.584 g, 5.4 mmol), and NMP (19 g). The solution is stirred at room temperature for 12 h, then acetic anhydride (2 mL) and triethylamine (3 mL) are added. The resulting solution is stirred at room temperature for another 48 h, and precipitated into methanol. The precipitate is filtered, and dried in a vacuum oven (120° C.) for 12 h to give the desired random (R)(+)-IBP copolymer containing structural units (I) and (II), each having a mole fraction of 0.50. Structural unit (I) contains the (R)(+)-indane moiety and is represented by formulas -[(XIII')-(VB)-(XIII)]-₀.₅₀, wherein $R^3$ is (XIIIa), each $R^1$ is hydrogen, and each $R^2$ is methyl. Structural unit (II) comprises -[(XIII'-(VIII)-(XIII)]-₀.₅₀, wherein $R^3$ is (XIIIa), each $R^1$ is hydrogen, x is 1, and each $R^2$ is methyl. The structure is confirmed by proton nuclear magnetic resonance.

EXAMPLES 3–8

The procedure of Example 2 is repeated except that the molar proportions of (R)(+)-IBP dianhydride, BPA dianhydride, and m-phenylenediamine are varied to produce random (R)(+)-IBP copolyetherimides containing structural units (I) and (II) having the following exemplary molar proportions ((I):(II)): 5:95; 25:75; 60:40; 75:25; 80:20; and 95:5. The structures are confirmed by proton nuclear magnetic resonance.

EXAMPLE 9

The procedure of Example 2 is repeated substituting an equimolar amount of racemic SBI dianhydride for the BPA dianhydride. The racemic SBI dianhydride is prepared following steps (i), (ii), and (iii) of Example 1 except that SBI is used in place of (R)(+)-5-hydroxy-3-(4-hydroxyphenyl)-1,1,3-trimethylindane. The polymerization reaction produces an (R) (+) -IBP/SBI polyetherimide containing the following randomly-distributed structural units (I) and (II), each unit having a mole fraction of 0.50: (I): -[(XIII')-(VB)-(XIII)-]$_{0.50}$, wherein $R^3$ is (XIIIa), each $R^1$ is hydrogen, and each $R^2$ is methyl; (II): -[(XIII')-(VI)-(XIII)]$_{0.50}$, wherein $R^3$ is (XIIIa), each $R^1$ is hydrogen, and each $R^2$ is methyl. The structure is confirmed by proton nuclear magnetic resonance.

EXAMPLES 10–15

The procedure of Example 9 is repeated except that the proportions of (R)(+)-IBP dianhydride, racemic SBI dianhydride, and m-phenylenediamine are varied to produce random (R)(+)-IBP copolyetherimides containing structural units (I) and (II) having the following exemplary mole percentages ((I):(II)): 5:95; 25:75; 60:40; 75:25; 80:20; and 95:5. The structures are confirmed by proton nuclear magnetic resonance.

EXAMPLES 16–23

The procedure of Example 2 is followed substituting the BPA dianhydride with an equimolar amount of one of the following: (S)(–)-SBI dianhydride, (R)(+)-SBI dianhydride, racemic IBP dianhydride, 4,4'-biphenol dianhydride, hexafluorobisphenol A dianhydride, resorcinol dianhydride, hydroquinone dianhydride or ethylene glycol bis (anhydrotrimellitate) or a dianhydride wherein a single bond, —O—, —S—, —SO$_2$—, —CO—, —C(CH$_3$)$_2$—, —C(CD$_3$)$_2$—, —C(CF$_3$)$_2$—, bridges each phthalic anhydride unit. Structure (I) is that of Example 2, and structure (II) comprises [(XIII')-A$^2$-(XIII)]$_{0.50}$, wherein A$^2$ is formula (IVA), (IVB), (VII), (VIII), (VIIIa), (VIIIb), (VIIIc), or a single bond, —O—, —S—, —SO$_2$—, —CO—, —C(CH$_3$)$_2$—, —C(CD$_3$)$_2$—, or —C(CF$_3$)$_2$—, respectively. Each $R^1$ is hydrogen, and each $R^2$ is methyl, except in formula (VIII) where each $R^2$ is CF$_3$ on the bridging carbon when x is 1. The structures are confirmed by proton nuclear magnetic resonance.

EXAMPLE 24

The procedure of Example I is repeated except that in step (iv), the flask is charged with (R)(+)-IBP dianhydride (1.00 g, 1.8 mmol), bisphenol A (BPA) dianhydride (0.937 g, 1.8 mmol), racemic SBI dianhydride (1.08 g, 1.8 mmol), m-phenylenediamine (0.584 g, 5.4 mmol), and NMP (19 g). The solution is stirred at room temperature for 12 h, then acetic anhydride (2 mL) and triethylamine (3 mL) are added. The resulting solution is stirred at room temperature for another 48 h, and precipitated into methanol. The precipitate is filtered, and dried in a vacuum oven (120° C.) for 12 h to give the desired random (R)(+)-IBP copolymer containing structural units (I), (II), and (III), each having a mole fraction of 0.33. Structural unit (I) contains the (R)(+)-indane moiety and is represented by formulas -[(XIII')-(VB)-(XIII)]$_{0.33}$, wherein $R^3$ is (XIIa), each $R^1$ is hydrogen, and each $R^2$ is methyl. Structural unit (II) comprises -[(X'II'-(VIII)-(XIJJ)]$_{0.33}$, wherein $R^3$ is (XIIIa), each $R^1$ is hydrogen, x is 1, and each $R^2$ is methyl. Structural unit (III) is -[(XIII'-(VI)-(XIII)]$_{0.33}$, wherein $R^3$ is (XIIIa), each $R^1$ is hydrogen, x is 1, and each $R^2$ is methyl. The structure is confirmed by proton nuclear magnetic resonance.

EXAMPLE 25

The procedure of Example 24 is repeated except that the following amounts of the dianhydrides are reacted with m-phenylenediamine (0.584 g, 5.4 mmol) in NMP (19 g): (R) (+) -IBP dianhydride (1.500 g, 2.7 mmol), bisphenol A (BPA) dianhydride (0.73 g, 1.35 mmol), racemic SBI dianhydride (0.81 g, 1.35 mmol). A random (R)(+)-indane copolymer containing structural units (I), (II), and (III) in the following molar proportion: 50:25:25. Structural unit (I) is represented by formulas -[(XIII')-(VB)-(XIII)]$_{0.50}$, wherein $R^3$ is (XIIIa), each $R^1$ is hydrogen, and each $R^2$ is methyl. Structural unit (II) comprises -[(XIII'-(VIJI)-(XIII)]$_{0.25}$, wherein $R^3$ is (XIIIa), each $R^1$ is hydrogen, x is 1, and each $R^2$ is methyl. Structural unit (III) is -[(XIII'-(VI)-(XIII)]$_{0.25}$, wherein $R^3$ is (XIIIa), each $R^1$ is hydrogen, x is 1, and each $R^2$ is methyl. The structure is confirmed by proton nuclear magnetic resonance.

EXAMPLE 26

The method of Example 1 is repeated substituting (S)(-)-IBP in step (i) for the (R)(+)-IBP enantiomer. Following the procedure of steps (ii)-(iv) produces (S)(-)-IBP polyetherimide having structural units (I) comprising -[(XIII')-(VA)-(XIII)]-, wherein $R^3$ is (XIIIa), each $R^1$ is hydrogen, and each $R^2$ is methyl. The structure is confirmed by proton nuclear magnetic resonance.

EXAMPLE 27

The method of Example 1 is repeated substituting (S)(-)-SBI in step (i) for (R)(+)-5-hydroxy-3 -(4-hydroxyphenyl)-1,1,3-trimethylindane. Following the procedure of steps (ii)-(iv) produces (S)(-)-SBI polyetherimide polymer having structural units (I) comprising -[(XIII')-(IVA)-(XIII)]-, wherein $R^3$ is (XIIIa), each $R^1$ is hydrogen, and each $R^2$ is methyl. The structure is confirmed by proton nuclear magnetic resonance.

EXAMPLE 28

(i) Synthesis of (R)(+)-SBI Bisimide

In a 1 L three-neck round bottomed flask equipped with a nitrogen inlet, thermometer, Dean-Stark trap, and condenser, (R)(+)-SBI (15.4 g, 50 mmol) was added portionwise to a slurry of 262 grams (102 mmol.) of sodium hydride in 100 mL of dry N,N-dimethylformamide. The mixture was magnetically stirred and heated for one hour at 75° C. in a nitrogen atmosphere, after which 20.6 grams (100 mmol) of N-methyl-4-nitro-phthalimide was added. The resulting mixture was heated for 1.5 hours at 110° C., cooled, then poured into 3 volumes of cold water. The solid precipitate was filtered and suspended in a mixture of toluene and 2% aqueous sodium hydroxide solution, and the mixture was cooled and filtered. The organic phase of the filtrate was dried and vacuum stripped. The combined solids were the desired (R)(+)-6,6'-bis(3,4-dicarboxyphenoxy)-3, 3,3',3'-tetramethylspiro(bis)indane bis-N-methylimide ((R)(+)-SBI bisimide) as confirmed by proton nuclear magnetic resonance.

(ii) Synthesis of (R)(+)-SBI Tetraacid

A 250 mL round bottomed flask equipped with a condenser was charged with (R)(+)-SBI bisimide (14 g, 22.36 mmol), 45% aqueous potassium hydroxide solution (16.7 g), and 20 mL water. The solution was heated to reflux, and water and methylamine were removed by distillation while replenishing the water. Heating was continued for 4 days until the distillate was neutral to pH paper. The solution was cooled to room temperature and added slowly to cold concentrated hydrochloric acid. The precipitate was collected by filtration and dried to give the desired (R)(+)-SBI tetracarboxylic acid. The structure was confirmed by proton nuclear magnetic resonance.

(iii) Synthesis of (R)(+)-SBI Dianhydride (R)(+)-SBI tetracarboxylic acid was dissolved in a mixture of 25 mL chlorobenzene and 5 mL acetic anhydride in a 100 mL round bottomed flask. Upon heating to reflux for 2.5 h, followed by cooling to room temperature, the desired (R)(+)-SBI dianhydride was produced. Proton nuclear magnetic resonance was used to confirm the structure.

(iv) Synthesis of (R)(+)-SBI Polyetherimide

The polymerization was conducted in a 25 mL round bottomed flask in an argon-filled glove box. The flask was charged with (R)(+)-SBI dianhydride (6 g, 10 mmol), m-phenylenediamine (1.081 g, 10 mmol), and 18 mg sodium phenylphosphonate in 60 mL o-dichlorobenzene. The solution was stirred at 130° C. for 1.5 h, then the temperature raised to 225° C. Water and solvent were removed by distillation to a total of 10 mL. The solution was heated under reflux for 3 h, cooled, and precipitated into 200 mL methanol. The precipitate was filtered, then dried in a vacuum oven (120° C.) for 12 h to give the desired (R)(+)-SBI polyetherimide comprising structural units (I): -[(XIII')-(IVB)-(XIII)]-, wherein $R^3$ is (XIIIa), each $R^1$ is hydrogen, and each $R^2$ is methyl. The structure was confirmed by proton nuclear magnetic resonance.

Procedure 2

Alternatively, chiral polyetherimide polymers of the present invention wherein $Z^2$ is (XIV) and Z' is (XIV'), i.e. phenylene moieties, in structures (I), (II), and (III), may be prepared by reacting the diphenoxyamine of a chiral spirobiindanol or indane bisphenol (structure (XVe) in formula (XV) above) with a tetracarboxylic acid or dianhydride. The chiral diphenoxyamine, i.e. bis-(4-aminophenoxy) spirobiindane/indane is prepared by reacting a chiral spirobiindanol, such as (R)(+)-SBI or (S)(–)-SBI or a chiral indane bisphenol, such as (R)(+)-IBP or (8)(-)-IBP, with a molar amount of 4-chloro-1-nitrobenzene that is 2 times that of the chiral spirobiindanol or indane bisphenol. The resulting chiral bis(nitrophenoxy) spirobiindane or indane is then reduced in the presence of a catalyst, such as palladium on carbon, to form the chiral diphenoxyamine, also referred to herein as the chiral diamine.

The polymerization is performed by reacting the chiral diamine with an appropriate tetracarboxylic acid, such as 1,2,3,4-cyclopentanetetracarboxylic acid, or with a dianhydride, such as those described and prepared above including BPA dianhydride, SBI dianhydride, etc. Alternatively, 5-(2,5-dioxotetrahydrol)-3-methyl-3-cyclohexene-1,2-dicarboxylic anhydride may be used as the dianhydride. Approximately equimolar amounts of the tetracarboxylic acid or dianhydride and chiral diamine are typically reacted in a polar aprotic solvent, such as N-methyl-2-pyrrolidinone (NMP), dimethylformamide (DMF), dimethyl sulfoxide (DMSO), or acetonitrile producing a chiral polyetherimide homopolymer comprising structural units (I). The polymerization reaction is typically conducted at room temperature in an inert atmosphere.

Similar to Procedure 1 described above, random copolymers comprising structural units (I), (II), and optionally (III) may be prepared by adding a second and optionally third diphenoxyamine of formulas (VI)–(VIII), (VIIIa), (VIIIb), or (VIIIc), such as BPA diamine, 4,4'-oxydianiline, hexafluorobisphenol A diamine, for example, to the polymerization reaction in varying molar amounts, and adjusting the amount of tetracarboxylic acid or dianhydride appropriately. Alternatively, two or three differing chiral diamines of formulas (IVA), (IVB), (VA), or (VB) may be added with the first chiral diamine. Likewise, diphenoxyamines bridged by a single bond, —O—, —S—, —SO$_2$—, —CO—, —C(CH$_3$)$_2$—, —C(CD$_3$)$_2$—, or —C(CF$_3$)$_2$— may be employed.

The following examples are illustrative.

EXAMPLE 29

(i) Synthesis of (R) (+)-3,3,3',3'- Tetramethyl-6,6'-Bis(4-Nitrophenoxy)- 1,1'-Spirobiindane A 50 mL three-neck round bottom flask equipped with a nitrogen inlet, thermometer, Dean-Stark trap, and condenser was charged with (R)(+)-6,6'-dihydroxy-3,3,3',3'-tetramethyl-1,1'-spirobiindane ((R)(+)-SBI)(5 g, 16.21 mmol), 4-chloro-1-nitrobenzene (5.36 g, 34.04 mmol), N,N-dimethylformamide (DMF) (60 mL), toluene (10 mL), and potassium carbonate (4.9 g). The solution was magnetically stirred and heated to reflux for 4 h. The solution was filtered to remove the salt, and the solvent was removed by evaporation at reduced pressure. The residue was then dissolved in 50 mL of acetone and filtered again, and the filtrate was evaporated to dryness to give the desired (R)(+)-SBI-dinitro compound (6 g, 67% yield). The structure was confirmed by proton nuclear magnetic resonance.

(ii) Synthesis of (R)(+)-3,3,3',3'-Tetramethyl-6,6'-Bis(4-Aminophenoxy)- 1,1'-Spirobiindane ((R)(+)-SBI Diphenoxyamine)

The reaction was conducted in a 50 mL round bottom flask equipped with a nitrogen inlet. The flask was charged with (R)(+)-3,3,3',3'-tetramethyl-6,6'-bis(4-nitrophenoxy)-1,1'-spirobiindane (1.5 g), cyclohexene (5 mL), THF (20 mL), and palladium on carbon (10% w/w, 0.5 g). The solution was magnetically stirred and heated to reflux for 6 h. The solution was filtered to remove the catalyst, and the solvent was removed by evaporation at reduced pressure. The residue was purified by column chromatography using silica gel as the stationary phase and mixed ethyl acetate and hexane (7:3 v/v) as solvent to give the desired chiral diphenoxyamine (1 g, 74% yield). The structure was confirmed by proton nuclear magnetic resonance.

(iii) Synthesis of (R)(+)-SBI Polyetherimide

The polymerization was conducted in a 25 mL round bottom flask in an argon-filled glove box. The flask was charged with BPA dianhydride (0.530 g, 1.02 mmol), (R)(+)-3,3,3',3'-tetramethyl-6,6-bis(4-aminophenoxy)-1,1-spirobiindane (0.500 g, 1.02 mmol), and NAP (5.5 g). The solution was stirred at room temperature for 20 h, then acetic anhydride (0.38 mL) and triethylamine(0.56 mL) were added. The resulting solution was stirred at room temperature for another 48 h, then precipitated into methanol. The precipitate was filtered and dried in a vacuum oven (150° C.) for 12 h to give the desired (R)(+)-SBI-polyetherimide (0.9 g, 90% yield) comprising structural units (I) represented by -[(XIV')-(IVB)-(XIV)]-, wherein $R^4$ is (XIVc), $R^5$ is (VIII), x is 1, each $R^1$ is hydrogen, and each $R^2$ is methyl. Proton nuclear magnetic resonance analysis confirmed the structure.

Characterization:

Glass transition temperature (Tg)=212° C.;

Weight average molecular weight (Mw)=126 kg/mole.

Specific rotation ($[\alpha]_D^{25}$)=+107±10°
(c=0.37 g/100 mL, CHCl$_3$)

Molecular rotation($[M]_D^{25}$)=+1040±100°

EXAMPLE 30

The procedure of Example 29 is repeated except that in step (iv), 1,2,3,4-cyclopentanetetracarboxylic dianhydride is substituted for BPA dianhydride. The resulting (R)(+)-SBI polyetherimide comprises structural units (I) represented by -[(XIV')-(IVB)-(XIV)]-, wherein $R^4$ is (XIVa), each $R^1$ is hydrogen, and each $R^2$ is methyl. The structure is confirmed by proton nuclear magnetic resonance.

EXAMPLE 31

The procedure of Example 29 is repeated substituting 5-(2,5-dioxotetrahydrol)-3 -methyl-3-cyclohexene- 1,2-dicarboxylic anhydride for BPA dianhydride to form (R)(+)-SBI polyetherimide of structural units (I) comprising -[(XIV')-(IVB)-(XIV)]-, wherein $R^4$ is(XIVb), each $R^1$ is hydrogen, and each $R^2$ is methyl. The structure is confirmed by proton nuclear magnetic resonance.

EXAMPLE 32

The procedure of Example 29 is repeated substituting hexafluorobisphenol A dianhydride for the BPA dianhydride to form (R)(+)-SBI polyetherimide having structural units (I) comprising -[((X'V')-(IVB)-(XIV)]-, wherein $R^4$ is (XIVc), $R^5$ is (VIII), x is 1, each $R^1$ is hydrogen, and each $R^2$ is methyl except in structure (VIII) where $R^2$ is CF$_3$. The structure is confirmed by proton nuclear magnetic resonance.

EXAMPLE 33

The procedure of Example 29 is repeated substituting (R)(+)-SBI dianhydride for the BPA dianhydride. The (R)(+)-SBI dianhydride is prepared following methods (i), (ii), and (iii) of Example 1 except that (R)(+)-SBI is used in place of (R)(+)-IBP. (R)(+)-SBI polyetherimide homopolymer is produced having structural units (I) comprising -[((XIV')-(IVB)-(XIV)]-, wherein $R^4$ is (XIVc), $R^5$ is (IVB), each $R^1$ is hydrogen, and each $R^2$ is methyl. The structure is confirmed by proton nuclear magnetic resonance.

EXAMPLE 34

The procedure of Example 29 is repeated substituting (R)(+)-IBP dianhydride for the BPA dianhydride. The (R)(+)-IBP dianhydride is prepared following methods (i), (ii), and (iii) of Example 1. (R)(+)-SBI-(R)(+)-IBP polyetherimide is formed having structural units (I) comprising -[(XIV')-(IVB)-(XIV)]-, wherein $R^4$ is (XIVc), $R^5$ is (VB), each $R^1$ is hydrogen, and each $R^2$ is methyl. The structure is confirmed by proton nuclear magnetic resonance each $R^1$ is hydrogen, and each $R^2$ is methyl. The structure is confirmed by proton nuclear magnetic resonance.

Procedure 3

A combination of the two procedures described above for the preparation of chiral polyetherimides results in a random polymer containing structural units (I) and (II), and optionally (III), wherein $Z^2$ differs in at least two of the units. For example, $Z^2$ may be formula (XIII) in structure (I), and (XIV) in (II). In this process, a diamine from the first synthetic process, such as m-phenylenediamine, a chiral diphenoxyamine from the second process, and a dianhydride, as described above, are combined such that the total number of moles of diamine is equivalent to the molar amount of dianhydride. Structural unit (III) is produced when a second dianhydride is added, and the molar amount of diamine is adjusted. The process is illustrated in the following example.

EXAMPLE 35

The polymerization is conducted in a 25 mL round bottomed flask in an argon-filled glove box. The flask is charged with BPA dianhydride (2.00 g, 3.85 mmol), (R)(+)-3,3,3',3'-tetramethyl-6,6'-bis(4-aminophenoxy)-1,1'-spirobiindane (0.942 g, 1.92 mmol), m-phenylene diamine (0.208 g, 1.94 mmol), and NMP (17 g). The solution is stirred at room temperature for 20 h, then acetic anhydride (0.7 mL) and triethylamine (1.0 mL) are added. The resulting solution is stirred at room temperature for another 48 h, and precipitated into methanol. The precipitate is filtered, and dried in a vacuum oven (150° C.) for 12 h to give the desired (R)(+)-SBI random copolymer containing structural units (I) and (II), each having a mole fraction of 0.50. Structural unit (I) contains the (R)(+)-SBI moiety and comprises -[(XIV')-(IVB)-(XIV)]-$_{0.50}$, wherein $R^4$ is (XIVc), and $R^5$ is (VIII), and x is 1. Structure (II) is -[(XIII')-(VIII)-(XIII)]-$_{0.50}$, wherein $R^3$ is (XIIIa), and x is 1. Each $R^1$ is hydrogen, and each $R^2$ is methyl. The structure is confirmed by proton nuclear magnetic resonance.

Polyethersulfones and Polyetherketones

In the optically active polyethersulfone and polyetherketone polymers, wherein a is 0 in structures (I), (II), and (III), the $Z^2$ radical may be any aromatic radical which contains at least one carbonyl or sulfone group. Illustrative radicals of this kind are moieties of bis(4-phenylene)sulfone, represented as formula (IX), the corresponding radical derived from benzophenone (formula (XI)), and radicals containing two carbonyls such as those represented in formulas (X) and (XII).

The optically active polyethersulfones and polyetherketones of the present invention may be prepared by reaction of a chiral spirobiindane bisphenol or indane bisphenol with a corresponding dihalo (preferably difluoro or dichloro) sulfone or ketone in the presence of a basic reagent such as potassium carbonate, which promotes the requisite nucleophilic aromatic substitution reaction. A relatively high boiling dipolar aprotic solvent, such as dimethyl sulfoxide (DMSO), N,N-dimethylacetamide (DMAC), N-methyl-2-pyrrolidinone (NMP), dimethylformamide (DMF), or 1,3-dimethyl-3,4,5,6-tetrahydro-2(1H)pyrimidinone (DMPU) is preferred, and suitable reaction temperatures are generally in the range of about 120°–180° C. Molar ratios of the chiral spirobiindane bisphenol or indane bisphenol to dihalo compound are generally 1:1 in the polyetherketone homopolymers and polyethersulfone homopolymers. The base is employed in an amount sufficient to promote the substitution reaction. In general, the molar amount of base is at least equivalent to the molar amount of chiral spirobiindane bisphenol or chiral indane bisphenol reacting, but is more typically about 2.0 to 3.0 moles base per mole of chiral bisphenol.

In polyetherketone and polyethersulfone copolymers, a second and optionally third dihydroxycompound, such as those from which the structures corresponding to $A^2$ and $A^3$ are derived, such as BPA, may be added to the reaction mixture in varying molar amounts with a corresponding molar amount of dihalo compound added. The amount of base is adjusted accordingly. The mole fractions of structures (I), (II), and optionally (III) may vary widely depending on the properties desired in the resulting optically active polyetherketone and polyethersulfone polymers.

Process temperatures are not critical, and temperatures between about 100°–200° C. are preferred for synthesizing the chiral polyetherketones and polyethersulfones of the present invention. The processes are carried out in an inert atmosphere over a period of time sufficient to produce the desired polymer in adequate yield. Reaction times are influenced by the reactants, reactant temperature, the concentration of the reactants (and catalyst if present), the choice of solvent, and other factors known to those of skill in the art. In general, the polymerization reactions are complete in about two to three hours.

It should be noted that although the optically active polyether polymers of the present invention generally comprise linear homo- and copolymers, the polymers may also include up to about 25% cyclic oligomers. For example, as shown in the following Tables I and III for chiral SBI polyetherketones and polyethersulfones, as the mole fraction of structural units (I) increases, so does the proportion of cyclic oligomers in the polymer. It was found that when polymers having a high mole fraction of structural unit (I) were prepared, such as 0.9 or 1.0, the use of high purity monomers was necessary to obtain polymers with high enough molecular weight for casting flexible films. Chiral SBI may be purified using conventional sublimation techniques, and commercially available reactants may be purified by recrystallization.

The preparation of the optically active polyethersulfones and polyetherketones of the present invention is illustrated by the following examples.

EXAMPLE 36
Preparation of (R)(+)-IBP Polyethersulfone

The polymerization reaction is conducted in a 50 mL three-neck round bottom flask equipped with a nitrogen inlet, thermometer, Dean-Stark trap, and condenser. The reaction vessel is charged with 4-fluorophenyl sulfone (1.421 g, 5.59 mmol), (R)(+)-5-hydroxy-3-(4-hydroxyphenyl)-1,1,3-trimethylindane (1.50 g, 5.59 mmol), potassium carbonate (1.5 g, 15.1 mmol), N,N-dimethylacetamide (DMAC) (16 g), and toluene (8 mL). The resulting mixture is refluxed for 1 h between 145° C. and 148° C., then the temperature is raised to 165° C. by removing toluene from the Dean-Stark trap. The reaction mixture is held at 160° C. for 1 h, then cooled and precipitated into methanol (100 mL). The crude product is collected, dried, and redissolved in chloroform (50 mL) followed by filtration through a layer of CELITE®. The solvent of the filtrate is removed and dried in a vacuum oven at 120° C. for 8 h to yield the desired chiral (R)(+)-IBP polyethersulfone. The polyethersulfone homopolymer comprises structural units (I) represented by -[(VB)-(IX)]-, wherein each $R^1$ is hydrogen, and each $R^2$ is methyl. The structure is confirmed by proton nuclear magnetic resonance. (An analogous reaction using racemic IBP for the (R)(+)-IBP resulted in a 63% product yield (1.7 g) and a polymer having a weight average molecular weight (Mw) of 63 kg/mole.)

EXAMPLE 37

The procedure of Example 36 was followed substituting 4,4'-biphenol and (R)(+)-SBI for the (R)(+)-IBP. After reacting 4-fluorophenyl sulfone (1.6480 g, 6.48 mmol) with 4,4'-biphenol (0.6038 g, 3.24 mmol) and (R)(+)-SBI (1.000 g, 3.24 mmol), a 70% yield (2.2 g) of the random polyethersulfone comprising structural units (I) and (II), each having a mole fraction of 0.50. Structural unit (I) contained the (R)(+)-SBI moiety and is represented by formulas -[(IVB)-(IX)]-0.50, wherein each $R^1$ is hydrogen, and each $R^2$ is methyl. Structural unit (II) comprises -[(VIII)-(IX)]-$_{0.5}$, wherein each $R^1$ is hydrogen, x is 0, and each $R^2$ is methyl. The structure was confirmed by proton nuclear magnetic resonance. The physical properties of the random optically active polyethersulfone polymer are listed in Table I, and the specific optical rotations ($[\alpha]_D^{25}$) and molecular rotations ($[M]_D^{25}$) are listed in Table II below.

EXAMPLES 38–40

The procedure of Example 37 was repeated except that the molar proportions of (R)(+)-SBI and 4,4'-biphenol were varied to produce several random (R)(+)-SBI copolyethersulfones containing structural units (I) and (II). Compositions having the following exemplary mole ratios ((I):(II)) were prepared: 0:100; 30:70; and 70:30. The structures were confirmed by proton nuclear magnetic resonance. The physical properties of the products are listed in Table I, and the specific optical rotations ($[\alpha]_D^{25}$) and molecular rotations ($[M]_D^{25}$) are listed in Table II below.

EXAMPLES 41–42

The procedure of Example 37 was repeated substituting (S)(-)-SBI for (R)(+)-SBI and varying the proportions of (S)(-)-SBI and 4,4'-biphenol to produce random (S)(-)-copolyethersulfones containing structural units (I) and (II). Compositions having the following exemplary mole ratios ((I):(II)) were prepared: 90:10; and 100:0. The structures were confirmed by proton nuclear magnetic resonance. The physical properties of the products are listed in Table I, and the specific optical rotations ($[\alpha]_D^{25}$) and molecular rotations ($[M]_D^{25}$) are listed in Table II below.

TABLE I

| Polymer | Mole Ratio (I:II) | Chiral SBI | Yield (%) | Cyclics (%) | Mw (kg/mole) | Mw/Mn | Tg (°C.) | Film |
|---|---|---|---|---|---|---|---|---|
| Example 38 | 0:100 | — | 75 | — | — | — | 230 | flexible (from NMP) |
| Example 39 | 30:70 | (R)(+) | 80 | 8 | 116 | 2.2 | 230 | flexible |
| Example 37 | 50:50 | (R)(+) | 70 | 7 | 85 | 2.0 | 221 | flexible |
| Example 40 | 70:30 | (R)(+) | 75 | 14 | 56 | 2.0 | 213 | flexible |
| Example 41 | 90:10 | (S)(-) | 80 | 20 | 83 | 2.1 | 218 | flexible |
| Example 42 | 100:0 | (S)(-) | 95 | 25 | 105 | 1.9 | 217 | flexible |

In Tables II and IV below, "M" represents the average molecular weight of the polymer repeating unit in grams/mole, and "Concentration" is the concentration of the polymer solution in chloroform (g/mL).

TABLE II

| Polymer | Mole Ratio (I:II) | Chiral SBI | Concentration (g/100 mL) (CHCl$_3$) | $[\alpha]_D^{25}$ | M (g/mole) | $[M]_D^{25}$ |
|---|---|---|---|---|---|---|
| Example 38 | 0:100 | — | — | 0 | 400.46 | 0 |
| Example 39 | 30:70 | (R)(+) | 2.60 | +55.8 | 437.12 | +244 |
| Example 37 | 50:50 | (R)(+) | 1.92 | +91.0 | 461.56 | +420 |
| Example 40 | 70:30 | (R)(+) | 2.16 | +120.4 | 486.00 | +585 |
| Example 41 | 90:10 | (S)(−) | 2.06 | −164.6 | 510.45 | −840 |
| Example 42 | 100:0 | (S)(−) | 2.16 | −180.7 | 522.67 | −944 |

As can be seen from Table II, the magnitude (absolute value) of the molecular rotations $[M]_D^{25}$ of the chiral polyethersulfones do not increase linearly with the mole fraction of chiral SBI. This result implies that there is a slightly higher degree of order in the polymer chain as the percentage of chiral SBI increases.

EXAMPLE 43

Preparation of (R)(+)-IBP Polyetherketone

The polymerization reaction is conducted in a 50 mL three-neck round bottom flask equipped with a nitrogen inlet, thermometer, Dean-Stark trap, and condenser. The flask is charged with (R)(+)-IBP (1 g, 3.7 mmol), 4,4'-difluorobenzophenone (0.813 g, 3.7 mmol), NMP (8 g), toluene (4 mL), and potassium carbonate (1.02 g). The solution is magnetically stirred and heated to reflux. The temperature of the solution is held at 150° C. for 1 h, then increased to 175° C. by removing toluene from the Dean-Stark trap. The solution is refluxed for another hour, then cooled. The reaction mixture is precipitated into methanol. The residue is collected by filtration and dissolved in 100 mL of chloroform followed by filtration through a layer of CELITE®. The chloroform solution is concentrated to 10 mL and precipitated into methanol. The precipitate is filtered, then dried in a vacuum oven (120° C.) for 12 h to give the desired (R)(+)-IBP polyetherketone (1.2 g,) having structural units (I) comprising -[(VB)-(XI)]-, wherein each $R^1$ is hydrogen, and each $R^2$ is methyl. The structure is confirmed by proton nuclear magnetic resonance. (An analogous reaction using racemic IBP for the (R)(+)-IBP resulted in a 72% product yield (1.2 g) and a polymer having a weight average molecular weight (Mw) of 112 kg/mole.)

EXAMPLE 44

The procedure of Example 43 was followed substituting (S)(−)-SBI for (R)(+)-IBP. The reaction between 4,4'-difluorobenzophenone (1.0612 g, 4.863 mmol) and (S)(−)-SBI (1.500 g, 4.863 mmol) was conducted in the presence of potassium carbonate (1.4 g) and DMAC (10 g) in toluene (2 mL). The reaction provided an 80% yield (1.9 g) of (8)(−)-SBI polyetherketone containing structural units (I) comprising -[(IVA)-(XI)]- wherein each $R^1$ is hydrogen, and each $R^2$ is methyl. The structure was confirmed by proton nuclear magnetic resonance. The random chiral polyetherketone polymer was amorphous and its physical properties are listed in Table III, and the specific optical rotations ($[\alpha]_D^{25}$) and molecular rotations ($[M]_D^{25}$) are listed in Table IV below.

EXAMPLE 45

The procedure of Example 44 was followed substituting 1,3-bis(4-fluorobenzoylbenzene) for 4,4'-difluorobenzophenone. 1,3-Bis(4-fluorobenzoylbenzene) was prepared from fluorobenzene and isophthaloyl acid chloride by Friedel Craft reaction. The polymerization reaction provided a 66% yield of (S)(−)-SBI polyetherketone containing structural units (I) comprising -[(IVA)-(XII)]- wherein each $R^1$ is hydrogen, and each $R^2$ is methyl. The structure was confirmed by proton nuclear magnetic resonance. The random chiral polyetherketone polymer was amorphous, and its physical properties are listed in Table III, and its specific optical rotations ($[\alpha]_D^{25}$) and molecular rotations ($[M]_D^{25}$) are listed in Table IV below.

EXAMPLE 46

The procedure of Example 44 was followed substituting 1,4-bis(4-fluorobenzoylbenzene) for 4,4'-difluorobenzophenone. 1,4-Bis(4-fluorobenzoylbenzene) was prepared from fluorobenzene and teraphthaloyl acid chloride via Friedel Craft reaction. The polymerization reaction provided a 75% yield of (S)(−)-SBI polyetherketone containing structural units (I) comprising —[(IVA)-(X)]— wherein each $R^1$ is hydrogen, and each $R^2$ is methyl. The structure was confirmed by proton nuclear magnetic resonance. The chiral polyetherketone was found to be crystalline with a melting point (Tm) of 364° C.

TABLE III

| Polymer | Chiral SBI | Yield (%) | Cyclics % | Mw (kg/mole) | Mw/Mn | Tg (°C.) | Film |
|---|---|---|---|---|---|---|---|
| Example 45 | (S)(−) | 66 | 25 | 83 | 2.2 | 167 | flexible |
| Example 44 | (S)(−) | 80 | 20 | 173 | 2.1 | 221 | flexible |

TABLE IV

| Polymer | Chiral SBI | Concentration (g/100 mL) | $[\alpha]_D^{25}$ | M (g/mole) | $[M]_D^{25}$ |
|---|---|---|---|---|---|
| Example 45 | (S)(−) | 1.95 (CHCl$_3$) | −151.3 | 590.73 | −893 |
| Example 44 | (S)(−) | 1.89 (CHCl$_3$) | −227.5 | 486.62 | −1107 |
| Pure SBI | (S)(−) | 0.35 (MeOH) | −34.1 | 308.42 | −105 |

Upon comparison of the specific rotation $[\alpha]_D^{25}$ of pure chiral (S)(−)-SBI with those of the chiral polyetherketone polymers, as shown in Table IV, the chiral polymers exhibited specific rotations that were about 4 to 6 times higher than that of (S)(−)-SBI monomer. Furthermore, the molecular rotations $[M]D^{25}$ of the chiral polymers were 8 to 10 times higher than that of chiral (S)(−)-SBI monomer. These results indicate that inclusion of the achiral $Z^2$ stuctural moieties into the polymers contributes to optical rotation.

The optically active polyether polymers of the present invention exhibit excellent thermal properties and are of high molecular weight making them useful in high temperature processing applications. In addition, the polymers have high optical rotations making them useful in optoelectronics applications where their achiral analogs cannot be used. Thus, unlike known poly(aryl)ether polymers, the present optically active polyethers have utility in the fabrication of chiral waveguides and can be used as polarizing coatings and filters.

While the invention has been particularly shown and described with reference to the preferred embodiments thereof, it will be understood by those skilled in the art that other changes in form and details may be made therein without departing from the spirit and scope of the invention.

We claim:

1. An optically active poly(aryl)ether polymer comprising structural units of formulas (I), (II), and (III)

and

wherein m is the mole fraction of structure (II), n is the mole fraction of structure (III), and the quantity 1−(m+n) is the mole fraction of structure (I); wherein m and n each independently have a value from 0 to about 0.99, and the sum of m and n is from 0 to about 0.99;

$A^1$ is selected from the group of optically active structural moieties having formulas (IVA), (IVB), (VA), or (VB)

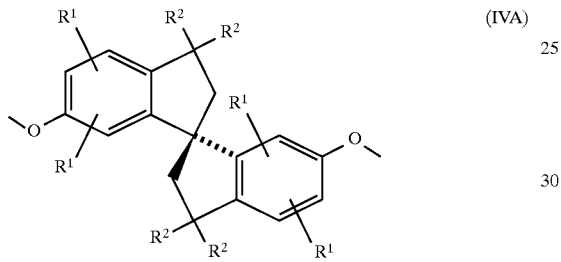

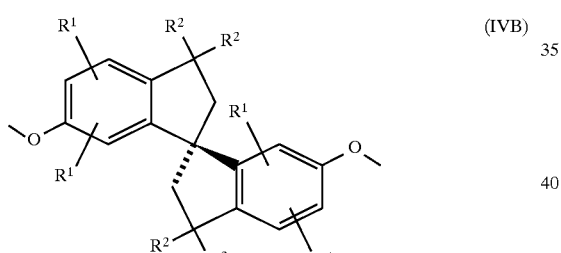

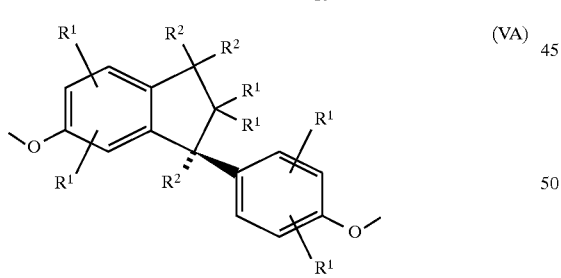

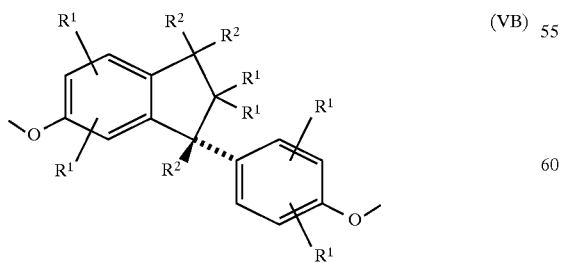

$A^2$ and $A^3$ are each independently a structural moiety selected from the group having formulas (IVA), (IVB), (VA), (VB), (VI), (VII), (VIII), (VIIIa), or (VIIb)

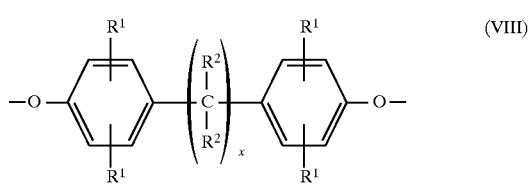

wherein x is 0 or 1;

wherein when $A^1$ is (IVA) and $A^2$ or $A^3$ is (IVB); and when $A^1$ is (IVB) and $A^2$ or $A^3$ is (IVA); and when $A^1$ is (VA) and $A^2$ or $A^3$ is (VB); and when $A^1$ is (VB) and $A^2$ or $A^3$ is (VA); then the mole fraction m or n of said structural units (II) or (III) corresponding to said $A^2$ or $A^3$ differs from the mole fraction (1−(m+n)) of said structural units (I) corresponding to said $A^1$; $Z^2$ is selected from the group of structural moieties having formulas (IX), (X), (XI), (XII), (XIII), or (XIV

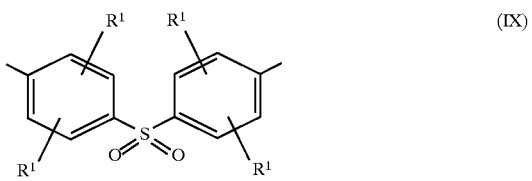

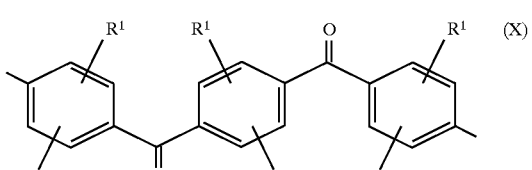

-continued

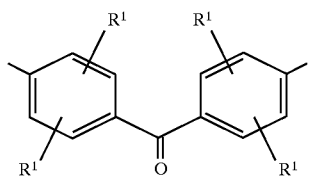 (XI)

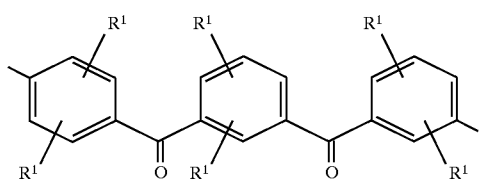 (XII)

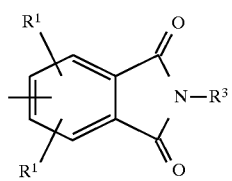 (XIII)

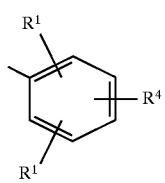 (XIV)

wherein when $Z^2$ is a structural moiety having formula (XIII) or (XIV), then $A^2$ and $A^3$ may also each independently be a single bond, —O—, —S—, —SO$_2$—, —CO—, —C(CH$_3$)$_2$—, —C(CD$_3$)$_2$—, —C(CF$_3$)$_2$—, or a structural moiety having formula (VIIIc)

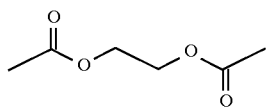 (VIIIc)

wherein $R^3$ is selected from the group of structural moieties having formulas (XIIIa), (XIIIb), (XIIIc), (XIIId), or (XIIIe)

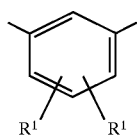 (XIIIa)

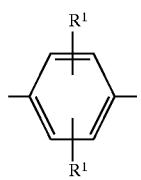 (XIIIb)

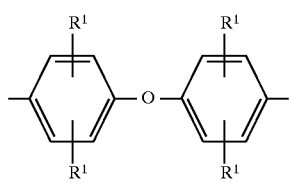 (XIIIc)

-continued

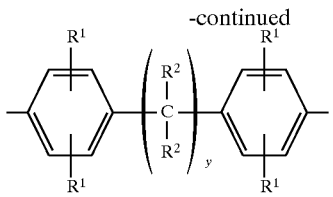 (XIIId)

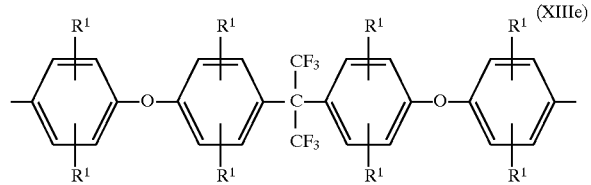 (XIIIe)

wherein y is 0 or 1;

wherein $R^4$ is selected from the group of structural moieties having formulas (XIVa), (XIVb), or (XIVc)

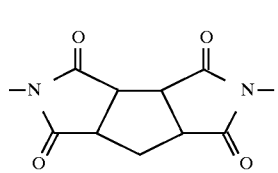 (XIVa)

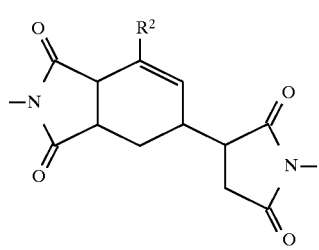 (XIVb)

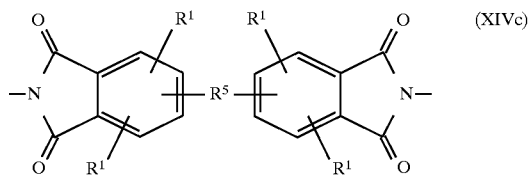 (XIVc)

wherein $R^5$ is a single bond or is selected from the group of —O—, —S—, —SO$_2$—, —CO—, —C(CH$_3$)$_2$—, —C(CD$_3$)$_2$—, —C(CF$_3$)$_2$—, or from the group of structural moieties having formulas (IVA), (IVB), (VA), (VB), (VI), (VII), (VIII), (VIIIa), (VIIIb), or (VIIIc), except when m and n are both 0, then $R^1$ is other than formula (IVA) when $A^1$ is formula (IVB); other than formula (IVB) when $A^1$ is formula (IVA); other than formula (VA) when $A^1$ is formula (VB); and other than formula (VB) when $A^1$ is formula (VA);

wherein a is 0 except when said selected structural moiety $Z^2$ has formula (XIII) or (XIV), then a is 1, and $Z^1$ has structural formula (XIII') when $Z^2$ has formula (XIII), and $Z^1$ has structural formula (XIV') when $Z^2$ has formula (XV)

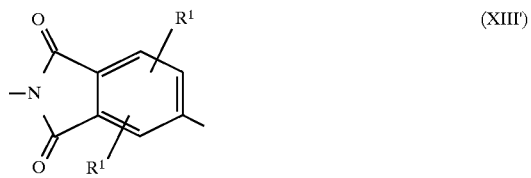 (XIII')

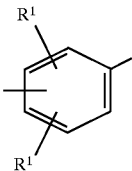

and wherein each $R^1$ and $R^2$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof.

2. The polymer of claim 1, wherein m and n are each 0.

3. The polymer of claim 1, wherein n is 0, and m has a value other than 0, and said structural units (I) and (II) are randomly distributed in said polymer.

4. The polymer of claim 3, wherein m is about 0.50.

5. The polymer of claim 1, wherein m and n each have values other than 0, and said structural units (I), (II), and (III) are randomly distributed in said polymer.

6. The polymer of claim 5, wherein m and n are each about 0.33.

7. The polymer of claim 1, wherein a is 0, and $Z^2$ has said formula (IX), said polymer being an optically active polyethersulfone polymer.

8. The polymer of claim 1, wherein a is 0, and $Z^2$ has said formula (X), (XI), or (XII), said polymer being an optically active polyetherketone polymer.

9. The polymer of claim 1, wherein a is 1, $Z^2$ has said formula (XIII), and $Z^1$ has said formula (XIII'), said polymer being an optically active polyetherimide polymer.

10. The polymer of claim 9, wherein $R^3$ in said formula (XIII) has said formula (XIIIa).

11. The polymer of claim 1, wherein a is 1, $Z^2$ has said formula (XIV), and $Z^1$ has said formula (XIV'), said polymer being an optically active polyetherimide polymer.

12. The polymer of claim 11, wherein $R^4$ in said formula (XIV) has said formula (XIVc), $R^5$ in said formula (XIVc) has said formula (VIII), and x is 1.

13. The polymer of claim 1, wherein a is 1, said polymer being an optically active polyetherimide copolymer comprising structural units (I), wherein $Z^2$ has said formula (XIII), and $Z^1$ has said formula (XIII'), and structural units (II), wherein $Z^2$ has said formula (XIV) and $Z^1$ has said formula (XIV').

14. The polymer of claim 1, wherein each $R^1$ is hydrogen or deuterium, and each $R^2$ is methyl, trifluoromethyl, or a deuterated equivalent thereof.

15. The polymer of claim 1, wherein the weight average molecular weight of said polymer is between about 10 kg/mole and 500 kg/mole.

16. The polymer of claim 1 having a glass transition temperature of at least 151° C. or a melting point of at least 250° C.

17. An optically active poly(aryl)ether polymer comprising an optically active structural moiety derived from an enantiomer of 6,6'-dihydroxy-3,3,3',3'-tetramethyl spirobiindane, said polymer having a glass transition temperature of at least 151° C. or a melting point of at least 250° C.

18. The polymer of claim 17, wherein said enantiomer is (R)(+)-6,6'-dihydroxy-3,3,3',3'-tetramethyl spirobiindane.

19. The polymer of claim 17, wherein said enantiomer is (S)(−)-6,6'-dihydroxy-3,3,3',3'-tetramethyl spirobiindane.

20. An optically active poly(aryl)ether polymer comprising an optically active structural moiety derived from an enantiomer of 5-hydroxy-3-(4-hydroxyphenyl)-1,1,3-trimethyl indane, said polymer having a glass transition temperature of at least 151° C. or a melting point of at least 250° C.

21. The polymer of claim 20, wherein said enantiomer is (R)(+)-5-hydroxy-3-(4-hydroxyphenyl)-1,1,3-trimethyl indane.

22. The polymer of claim 20, wherein said enantiomer is (S)(−)-5-hydroxy-3-(4-hydroxyphenyl)-1,1,3-trimethyl indane.

* * * * *

UNITED STATES PATENT AND TRADEMARK OFFICE
CERTIFICATE OF CORRECTION

PATENT NO. : 5,856,422
DATED : Jan. 5, 1999
INVENTOR(S) : Chan et al.

It is certified that error appears in the above-identified patent and that said Letters Patent is hereby corrected as shown below:

On the title page, item [54], delete "SPIROBINDANE" replace with --SPIROBIINDANE--

Column 27, Line 67    delete "(VIIb)" replace with --(VIIIb)--

Column 28, Line 52    delete "(XIV" replace with --(XIV)--

Column 30, Line 49    delete " $R^1$ " replace with -- $R^5$ --

Column 30, Line 58    delete "(XV)" replace with --(XIV)--

Signed and Sealed this

Eighteenth Day of May, 1999

Attest:

Q. TODD DICKINSON

*Attesting Officer*    *Acting Commissioner of Patents and Trademarks*